(12) United States Patent
McGrogan et al.

(10) Patent No.: US 8,346,489 B2
(45) Date of Patent: Jan. 1, 2013

(54) METHOD AND SYSTEM FOR DETERMINING OUTPUT TORQUE CAPABILITIES IN HYBRID AND ELECTRIC POWERTRAINS

(75) Inventors: Sean W. McGrogan, Ann Arbor, MI (US); Anthony H. Heap, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 305 days.

(21) Appl. No.: 12/892,034

(22) Filed: Sep. 28, 2010

(65) Prior Publication Data

US 2012/0078536 A1 Mar. 29, 2012

(51) Int. Cl.
*G01L 1/00* (2006.01)
(52) U.S. Cl. .......................................................... 702/41
(58) Field of Classification Search .................... 702/41, 702/182–185
See application file for complete search history.

(56) References Cited

U.S. PATENT DOCUMENTS 7,463,968 B2 * 12/2008 Snyder ........................... 701/112
8,095,254 B2 * 1/2012 Heap et al. ....................... 701/22

* cited by examiner

*Primary Examiner* — Edward Raymond
(74) *Attorney, Agent, or Firm* — Quinn Law Group, PLLC

(57) ABSTRACT

A method for determining output torque capabilities in a transmission having a first, second, and third node, each of which has a speed and acceleration. The method includes controlling the speed of the first node, calculating a real maximum long-term output torque capability (raw max LT) as a function of at least the acceleration and the speed of the first and second nodes, and calculating an inertialess maximum long-term output torque capability (inertialess max LT), which is identical to the raw max LT except that the inertialess max LT ignores torque capability due to acceleration of the first node. The raw max LT and the inertialess max LT are compared to determine an operating capability for the transmission. The first node may be an input node for the transmission. The method may include determining a new effective minimum long-term output torque capability (new effective min LT) by similar considerations.

11 Claims, 3 Drawing Sheets

METHOD AND SYSTEM FOR DETERMINING OUTPUT TORQUE CAPABILITIES IN HYBRID AND ELECTRIC POWERTRAINS

TECHNICAL FIELD

This disclosure relates to methods for determining, calculating, and controlling output torque capabilities in powertrains of alternative energy vehicles, such as hybrid and electric vehicles.

BACKGROUND

Motorized vehicles include a powertrain operable to propel the vehicle and power the onboard vehicle electronics. The powertrain, or drivetrain, generally includes an engine that powers the final drive system through a multi-speed power transmission. Many vehicles are powered by a reciprocating-piston type internal combustion engine (ICE).

Hybrid vehicles utilize multiple, alternative power sources to propel the vehicle, minimizing reliance on the engine for power. A hybrid electric vehicle (HEV), for example, incorporates both electric energy and chemical energy, and converts the same into mechanical power to propel the vehicle and power the vehicle systems. The HEV generally employs one or more electric machines (motor/generators) that operate individually or in concert with the internal combustion engine to propel the vehicle. Electric vehicles also include one or more electric machines and energy storage devices used to propel the vehicle.

The electric machines convert kinetic energy into electric energy which may be stored in an energy storage device. The electric energy from the energy storage device may then be converted back into kinetic energy for propulsion of the vehicle, or may be used to power electronics and auxiliary devices or components.

SUMMARY

A method for determining output torque capabilities in a transmission is provided. The transmission has a first node, a second node, and a third node, each of which has a speed and acceleration. The method includes controlling the speed of the first node and calculating a real maximum long-term output torque capability (raw max LT) as a function of at least the acceleration and the speed of the first node and the second node. The method also includes calculating an inertialess maximum long-term output torque capability (inertialess max LT), which is identical to the raw max LT except that the inertialess max LT ignores torque capability due to the acceleration of the first node.

The method includes comparing the raw max LT to the inertialess max LT to determine an operating capability for the transmission. If the raw max LT is greater than the inertialess max LT, the method selects the inertialess max LT, and if the raw max LT is not greater than the inertialess max LT, the method selects the raw max LT. The method may also compare the raw max LT and the inertialess max LT to a previous effective maximum long-term output torque capability (previous effective max LT) in order to determine a new effective maximum long-term output torque capability (new effective max LT) relative to previous iterations of the method. The method may further include determining a new effective minimum long-term output torque capability (new effective min LT) by similar considerations.

A system operative for determining output torque capabilities in a transmission is also provided. The system has a controller configured to control the speed of the first node (which may be the input node), and configured to calculate the new effective max LT from the previous effective max LT, the raw max LT, and the inertialess max LT.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
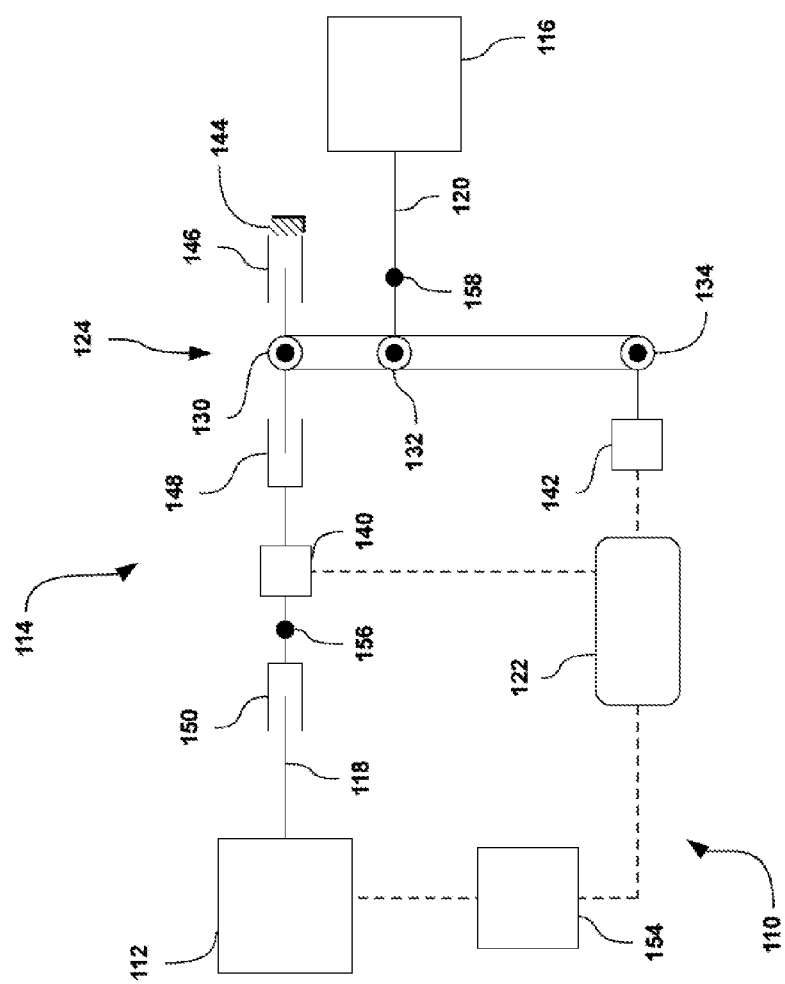
FIG. 1 is a schematic lever diagram illustration of an exemplary hybrid vehicle powertrain having two electric machines and one planetary gear set.

Referring to the drawings, wherein like reference numbers correspond to like or similar components throughout the several figures, there is shown in FIG. 1 a lever diagram depiction of an exemplary vehicle powertrain system, designated generally as 110. The powertrain 110 includes an internal combustion engine 112 selectively, drivingly connected to a transmission 114. The transmission 114 may be a multi-mode, electrically-variable transmission, and is in power flow communication with a final drive 116.

A lever diagram is a schematic representation of the components of a mechanical device, such as an automatic transmission. Each individual lever represents a planetary gear set, the three basic mechanical components of which are each represented by a node. Therefore, a single lever contains three nodes: one for the sun gear member, one for the planet gear carrier member, and one for the ring gear member. The relative length between the nodes of each lever may be used to represent the ring-to-sun ratio of each respective gear set. These lever ratios, in turn, are used to vary the gear ratios of the transmission in order to achieve appropriate ratios and ratio progression.

Mechanical couplings or interconnections between the nodes of the various planetary gear sets and other components of the transmission (such as motor/generators) are illustrated by thin, horizontal lines. Torque-transmitting mechanisms or torque transfer devices, such as clutches and brakes, are presented as interleaved fingers. If the mechanism is a brake, one set of the fingers is grounded.

While the present invention is described in detail with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims.

The transmission 114 is designed to selectively receive a portion of its driving power from the engine 112 via an input member 118. The transmission input member 118 may be the engine output shaft (also referred to as a crankshaft). The input member 118 transfers power to the transmission 114, which distributes output power and output torque through an output shaft 120 to the final drive 116 to propel the vehicle (not shown). Output torque and output torque capabilities may also be referred to as axle torque. A battery 122 acts as an energy storage device for the powertrain 110 and may be a chemical battery, battery pack, or another energy storage device recognizable to those having ordinary skill in the art.

In the exemplary embodiment described herein, wherein the powertrain 110 is used as a land vehicle, the output shaft 120 is operatively connected to the final drive 116 (or driveline). The final drive 116 may include a front or rear differential, or other torque-transmitting mechanism, which provides torque output to one or more wheels through respective vehicular axles or half-shafts (not shown). The wheels may be either front or rear wheels of the vehicle on which they are employed, or they may be a drive gear of a track vehicle. Those having ordinary skill in the art will recognize that the final drive 116 may include any known configuration, including front-wheel drive (FWD), rear-wheel drive (RWD), four-wheel drive (4WD), or all-wheel drive (AWD), without altering the scope of the claimed invention.

The powertrain 110 utilizes at least one differential gear arrangement, such as an epicyclic planetary gear set, a first planetary gear set 124 (which may be referred to as P1). The first planetary gear set 124 has three gear members: a first gear member 130, a second gear member 132, and a third gear member 134. The first, second and third gear members 130, 132, and 134 of first planetary gear set 124 may be identified as "first" to "third" in any order in the drawings (e.g., top to bottom, bottom to top) and may be the sun gear member, the planet gear carrier member, or the ring gear member in any order, depending upon the configuration of the transmission 114.

The first planetary gear set 124 may be either a simple planetary gear set or a compound planetary gear set. Furthermore, the first planetary gear set 124 may be either a single-pinion (simple) carrier assembly or a double-pinion (compound) carrier assembly. Embodiments with long pinions are also possible.

A first motor/generator or first electric machine 140 is disposed between the engine 112 and the first gear member 130 of the first planetary gear set 124. The first electric machine 140 (which may as be referred herein as motor A) is an electric machine capable of converting kinetic energy into electric energy and of converting electric energy into kinetic energy. The third gear member 134 of the first planetary gear set 124 is continuously connected to a second motor/generator or second electric machine 142 (may be interchangeably referred to herein as motor B).

The transmission 114 includes both the engine 112 and one or more electric machines (such as the first electric machine 140 and the second electric machine 142), and may, therefore, be referred to as a hybrid transmission. Similarly, the powertrain 110 may be referred to as a hybrid powertrain. However, purely electric powertrains and transmissions may also be used with the algorithms and methods described herein, and may also be referred to as "hybrid," due to the use of alternative fuel sources. For example, the engine 112 may be removed from the powertrain 110 and a fuel cell (not shown) or an electrical plug input (not shown) may be placed in communication with the powertrain 110.

The transmission 114 includes three torque-transmitting mechanisms. In the exemplary embodiment depicted in FIG. 1, the torque-transmitting mechanisms are friction clutches. However, other clutch configurations may be employed, such as dog clutches, rocker clutches, and others suitable for use within the transmission 114. The torque-transmitting mechanisms may be hydraulically actuated, receiving pressurized hydraulic fluid from a pump (not shown). Torque-transmitting mechanisms acting as brakes may be selectively connected to a static element of the powertrain 110, such as a transmission housing 144 of the transmission 114.

A first torque-transmitting mechanism 146—which may be interchangeably referred to as clutch C1—selectively connects the first gear member 130 with a stationary member, represented in FIG. 1 by the transmission housing 144. The first gear member 130 is also selectively connectable to the first electric machine 140 through engagement of a second torque-transmitting mechanism 148—which may be interchangeably referred to as clutch C2. A third torque-transmitting mechanism 150—which may be interchangeably referred to as clutch C3—selectively connects the first electric machine 140 to the engine 112.

A controller 154 is in communication with some or all elements of the powertrain 110 and effects control over the powertrain 110. The controller 154 has a distributed controller architecture, which may be a microprocessor-based electronic control unit (ECU). The controller 154 includes a storage medium with a suitable amount of programmable memory, and is capable of storing and executing one or more methods to effect control of the powertrain 110.

The controller 154 may include multiple control modules or components in communication with each other and the powertrain 110. For example, and without limitation, the controller 154 may represent both a hybrid control processor (HCP) and an engine control module (ECM). The controller 154 may be configured to execute methods or tasks other than those described herein. The controller 154 may be only a portion of the control architecture of the vehicle or the powertrain 110.

The engine 112, the first electric machine 140, and the second electric machine 142 may operate individually or in concert with the first planetary gear set 124 and the selectively-engageable torque-transmitting mechanisms, clutches C1-C3, to rotate the output shaft 120. The controller 154 is in communication with and controls the prime movers—the engine 112, the first electric machine 140, and the second electric machine 142—of the powertrain 110.

In addition to the nodes at the first through third gear members 130, 132, 134, other nodes of the powertrain 110 may be identified and tracked during operation of the vehicle into which the powertrain 110 is incorporated. In FIG. 1, the different nodes are represented by black circles or dots, and are illustrative of the location of the node, but may not represent actual structure. An input node 156 is located at the input to the transmission 114. The controller 154 measures an input speed, Ni, and an input acceleration, Ni_dot, at the input node 156. Depending upon the direction of rotation chosen as positive, the input speed may be either positive or negative.

When the third torque-transmitting mechanism 150 is engaged, the input node 156 rotates in concert with the engine 112. The input node 156 is locked to the first electric machine 140, such that a speed and acceleration of the first electric machine 140 are equal to the input speed and the input acceleration. Note that, as used herein, acceleration refers both to positive acceleration and to negative acceleration (deceleration).

An output node 158 is located on the output shaft 120 of the transmission 114. The controller 154 also measures an output speed, No, and an output acceleration, No_dot, at the output node 158. Output speed may also be positive or negative, with positive output speed generally referring to the direction of rotation which propels the vehicle forward. The output node 158 and the node for the second gear member 132 are locked together. The node for the third gear member 134 is locked to the second electric machine 142, and therefore represents a motor speed, Nb, and a motor acceleration Nb_dot, of the second electric machine 142. The input node 156, output node 158, and the second electric machine 142 may be referred to as a first node, a second node, and a third node. However, the respective nodes may be designated by any number, and the examples given are not limiting.

Controlling some or all of the engine 112, the input node 156, and the second electric machine 142 allows the powertrain 110 to control the speed, acceleration, and output torque of the final drive 116, as measured or estimated at the output node 158. The powertrain 110 may include additional nodes tracked and controlled by the controller 154, such as nodes relating to the first, second, and third torque-transmitting mechanisms 146, 148, and 150.

The first, second, and third torque-transmitting mechanisms 146, 148, and 150 are selectively engageable to selectively activate the gear elements for establishing different forward and reverse speed ratios and modes between the transmission 114 input node 156 and the output node 158. Shifting from one speed ratio or mode to another may be in response to vehicle conditions and operator (driver) demands. The speed ratio is generally defined as the input speed divided by the output speed. Thus, a low gear range has a high speed ratio, and a high gear range has a relatively lower speed ratio.

Because the transmission 114 is an electrically-variable transmission (EVT), it is not limited to single-speed gear ratios, the different operating states may be referred to as ranges or modes. The range or mode change may be controlled through a multi-clutch synchronization and release process.

EVTs provide for continuously variable speed ratios by combining features from both series and parallel hybrid powertrain architectures, and also elements of traditional, non-hybrid transmissions. EVTs may be designed to operate in both fixed-gear (FG) modes and EVT modes. When the transmission 114 is operating in a fixed-gear mode, the rotational speed of the output node 158 is a fixed ratio of the rotational speed of the input node 156, depending upon the selected arrangement of the differential gearing subsets. EVTs are also configured for engine operation that is mechanically independent from the final drive, thereby enabling high-torque continuously-variable speed ratios, electrically dominated launches, regenerative braking, engine-off idling, and two-mode operation. Other modes of operation are also possible, such as electric torque converter modes.

The transmission 114 may combine the first and second electric machines 140 and 142 with the differential gearing of the first planetary gear set 124 to achieve continuously variable torque and speed ratios between the input node 156 and the output node 158. The transmission 114 can utilize the differential gearing to send a fraction of its transmitted power through the first and second electric machines 140 and 142 and the remainder of its power through another, parallel path that is mechanical. One form of differential gearing used is the epicyclic planetary gear arrangement. However, it is possible to design a power split transmission without planetary gears, for example, as by using bevel gears or other differential gearing.

As the driver of the vehicle requests torque from the powertrain 110, the controller 154 determines how to best satisfy the driver's request. However, the controller 154 will also determine whether the powertrain 110 can satisfy the request. The driver's requested driving conditions may be converted to a torque request by the controller 154 or other parts of the control architecture for the vehicle.

To determine whether the torque request can be satisfied, the controller 154 will calculate or determine output torque capabilities for the powertrain 110. The controller will determine at least the following absolute or raw capabilities (abbreviations for each are also given): a raw maximum long-term output torque capability (raw max LT), a raw minimum long-term output torque capability (raw min LT), a raw maximum short-term torque capability (raw max ST), and a raw minimum short-term torque capability (raw min ST).

Individual components within the powertrain 110 have operating constraints or limits beyond which, especially for extended (longer than transient) time periods, the component may be prone to damage, failure, or excess wear. Each of the individual component limits includes a minimum and a maximum individual limit due to the respective component, such that—as long as the maximum and minimum are not equal—the individual component limits are ranges. The output torque capabilities calculated by the controller 154 are an amalgamation of each of the individual component limits.

As operating conditions of the vehicle and the powertrain 110 change, so do the individual component limits. In order to protect the components, the controller 154 monitors the operating conditions of the powertrain 110 and individual components and determines the resulting output torque capabilities for the powertrain 110 that are best able to protect all individual components.

Where one or more of the torque-transmitting mechanisms 130, 132, or 134 is a hydraulic clutch or brake, the individual component constraints for that torque-transmitting are not only physical limits based upon the friction materials of the clutch, but also limits based upon the hydraulic pressure engaging the clutch plates. Generally, individual limits for torque-transmitting mechanisms 130, 132, or 134 are calculated only when the clutch is engaged or partially engaged (slipping), as opposed to completely disengaged (open, and not carrying or transferring torque). This is referred to as a "locked" clutch. A completely open, unlocked, non-torque-carrying clutch may be modeled as having infinitely large limits (which would not ever limit operation of the powertrain 110). In order to protect the locked clutches, individual limits or constraints may be calculated as minimum and maximum amounts of torque which may be transferred across individual locked clutches. Satisfying these individual limits will result in protection of the locked clutches.

In addition to limits for the torque-transmitting mechanisms 130, 132, or 134, further hardware limits or component constraints may be implemented in order to protect the first electric machine 140 and the second electric machine 142. Additionally, the first electric machine 140 and the second electric machine 142 have torque capabilities, TA and TB, respectively. The capabilities, both positive and negative, contribute to the output torque capabilities calculated by the controller 154 for the powertrain 110.

The battery 122 may also have individual component limits that may affect the overall output torque capabilities for the powertrain 110. Individual component limits for the battery 122 may be determined by characteristics of the battery 122 and state information including, but not limited to: battery temperature, state of charge (SOC), life target (in years or duty cycles), particular cell chemistry of the battery pack, the number of cells within the battery pack, and other state information recognizable to those having ordinary skill in the art.

Determination of the hardware limits or individual component constraints may occur within the controller 154 or may be determined elsewhere in the control architecture for the vehicle or powertrain 110. If the individual component constraints are determined elsewhere, the controller 154 may treat them as inputs or given values within equations. The controller 154 monitors the individual component limits and factors those limits into a determination of the overall maximum and minimum output torque capabilities for the powertrain 110, as described herein.

From the individual component limits and characteristics, the controller 154 may calculate the output torque capabilities with a fundamental output torque equation, which may be the following: $To = k11*Ta + k12*Tb + k14*No + k15*No\_dot + k16*Ni + k17*Ni\_dot \ldots + \text{other terms}$. Each of the k terms is a constant for the adjacent component term or operating state. The short-term and long-term fundamental output torque equations may be identical other than using different constant terms.

The above fundamental output torque equation may contain additional terms and the list of terms herein is not limiting. When calculating the raw torque capabilities all relevant components are included in the calculation. Furthermore, the fundamental output torque equation can be modified to determine either the maximum or minimum torque output capabilities by inputting the maximum and minimum values of individual range limits.

Generally, the long term versus the short term may be distinguished in that the maximum short-term torque capabilities may represent acceptable, temporary deviations from the maximum long-term torque capabilities. The long-term capabilities are configured based upon levels which will not degrade the durability and performance of the components over their respective life cycles. Therefore, the maximum long-term torque capabilities may be violated for short periods of time without negatively impacting the long-term durability of the components of the transmission 114, as long as the maximum short-term torque capabilities are not also violated. For illustrative purposes, the description herein will focus on long-term output torque capabilities.

The final output capabilities—which may be determine by subsequent methods, algorithms, or arbitration following the description herein—acts as limits or constraints on operation of the powertrain 110. Therefore, when the driver (or the cruise control module, for example) requests torque which is outside of the torque capabilities (above the maximum capability or below the minimum) the control architecture will not allow that request to be met by the powertrain 110.

Collectively, all of the available, relevant inputs to the fundamental torque equation may be referred to as the raw input set. When the raw input set is used in the fundamental output torque equation to calculate long-term capabilities, the result is either the raw max LT or the raw min LT. As described herein, the controller 154 may be calculating other torque output capabilities.

Figure 2:
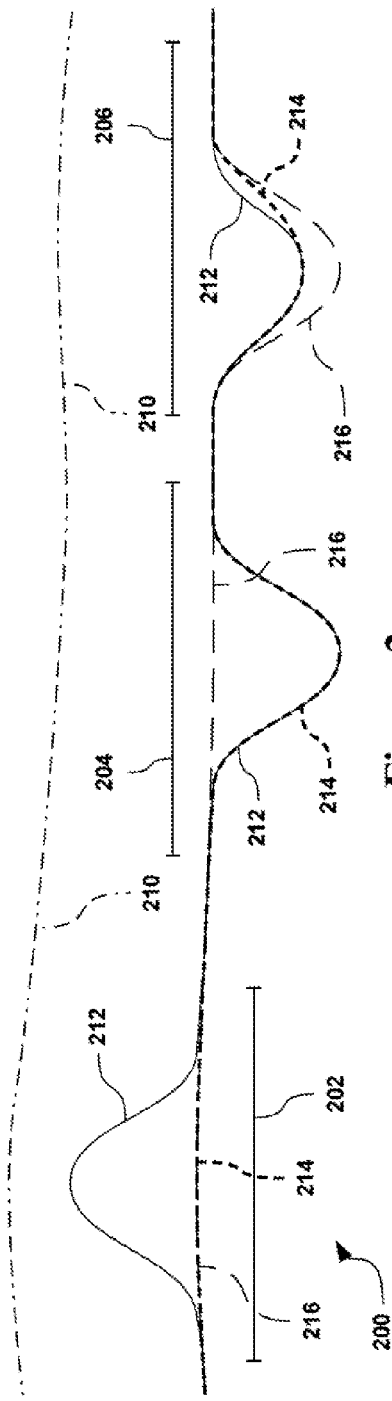
FIG. 2 is an illustrative graph of a driver request greater than maximum long-term output torque.

Referring now to FIG. 2, and with continued reference to FIG. 1, there are shown some characteristics of the powertrain 110 during an illustrative driving period 200. The driving period 200 shown may occur, for example, when the driver requests heavy acceleration of the vehicle, causing the vehicle to downshift in order to accelerate the vehicle. The driving period 200 is sub-divided, for illustrative purposes only, into a first event 202, a second event 204, and a third event 206. Each of the first through third event 202, 204, and 206 may actually occur as separate events, unrelated to each other.

A driver request 210 shows the level of output torque being requested by the driver, as often signaled by a gas pedal (not shown) or cruise control module. A line 212 illustrates the raw max LT during the driving period 200 and is shown as a solid line. A line 214 illustrates an effective maximum long-term output torque capability (effective max LT) during the driving period 200 and is shown as a thick dashed line. The effective max LT may be the result of the methods and methods described herein. A line 216 illustrates an inertialess maximum long-term output torque capability (inertialess max LT) during the driving period 200 and is shown as thin, long dashes. The inertialess max LT is the result of a calculation using a different input set in the fundamental torque equation, as described herein. Lines 212 and 216 often overlap and are coincident with line 214, the effective max LT.

During some operating modes and transitional phases of the transmission 114, there are two speed degrees of freedom. For example, during fixed gear operation, the input speed (Ni, at the input node 156) and the output speed (No, at the output node 158) have a fixed proportional relationship—the gear ratio. Therefore, operation of the transmission 114 may be effected through control of either the input speed or the output speed, but not both. Because the output node 158 is directly connected to the final drive 116, the output speed is generally controlled by the vehicle itself and the controller 154 modifies the input speed in order to control the powertrain 110. Other gear or mode ratios also result in two speed degrees of freedom, and also result in the input node 156 being the controlled node.

When the input node 156 is the controlled node, especially during shifts between different modes of operation for the transmission 114, changes in speed of the input node 156 may cause fluctuations in the output torque capabilities (raw max LT) of the powertrain 110. For example, decelerating the input node 156 in order to decelerate the first electric machine 140 may cause an increase in the raw max LT, as shown on the line 212 during the first event 202. This temporary increase in output torque capability is due to the inertia stored in the rotating input node 156 (which is directly connected to the first electric machine 140). As used herein, inertia generally refers to the tendency of a rotating body to resist acceleration; the tendency of a body at rest to remain at rest or of a body in motion to stay in motion unless acted on by an outside torque.

However, this torque bobble is a temporary increase—probably less than one second—and the raw max LT quickly returns to the prior level as the inertial effects cease to increase the output torque capabilities, which may occur as the acceleration of the input node 156 (Ni_dot) nears zero or may occur as the inertial effects are used to accelerate other components, such as the second electric machine 142. The input node 156 may be accelerating or decelerating to zero input speed (Ni) or to non-zero input speed.

As shown in FIG. 2, the driver request 210 cannot be met throughout the illustrative driving period 200. Therefore, the actual torque output of the vehicle will be limited by the output torque capabilities calculated by the controller 154. If the controller 154 simply used the raw max LT to control the powertrain 110, the temporary torque increase during the first event 202 would be sent to the output node 158 and would give the vehicle a quick boost of higher output torque followed almost immediately by removing that additional torque output. To the driver, the first event 202 may feel like a sudden increase in acceleration followed by a sudden removal of that added acceleration. Therefore, the controller 154 also calculates the inertialess max LT.

The inertialess max LT is calculated from the fundamental torque equation. However, while the raw max LT is calculated from the raw input set, which includes torque limits from all relevant components, the inertialess max LT is calculated from an inertialess input set, which is the raw input set minus the terms caused by controlling the input node 156. Whenever the first electric machine 140 is being accelerated or decelerated, such that Ni_dot is non-zero, the inertia of the input node 156 causes fluctuations in the raw max LT, as shown in the torque bobble of line 212 during the first event 202.

By removing the Ni_dot term from the fundamental torque equation, or by setting the associated constant (k15, in the illustrative equation shown herein) equal to zero, the controller 154 calculates output torque capabilities without the effects of deceleration or acceleration of the input node 156 (the controlled node). The Ni_dot term may be either a measured term (taken from accelerometers or other sensors) or may be a commanded term, such that the controller 154 is commanding in order to induce specific changes to the acceleration of the input node 156 and also removing the commanded values from the output torque capabilities equation to calculate the inertialess max LT.

During the first event 202, the inertialess max LT remains substantially flat (the line 216 and the line 214 are coincident) and does not follow the increasing (and then decreasing) raw max LT shown on the line 212. After calculating both the raw max LT (line 212) and the inertialess max LT (line 216), the controller 154 may then decide which output torque capability will be used as the effective max LT. The process of selecting between the options of the raw max LT and the inertialess max LT to determine or calculate the effective max LT may be referred to as arbitration and may be done mathematically or logically (or a mix of both).

When the maximum torque capabilities (either the raw max LT or the inertialess max LT) are increasing, the capabilities are considered to be widening. Similarly, when the minimum torque capabilities (either the raw min LT or the inertialess min LT) are decreasing, the capabilities are considered to be widening. When output torque capabilities are widening, the powertrain 110 has higher maximums and/or lower minimums. Conversely, when output torque capabilities are narrowing, the powertrain 110 has lower maximums and/or higher minimums and is operating within a relatively tighter band. Furthermore, the maximum and minimum capabilities may move in the same direction (both positive or upward, as shown in FIG. 2) such that one capability increases and the other deceases, but the total operating range or band is relatively unchanged.

Figure 4:
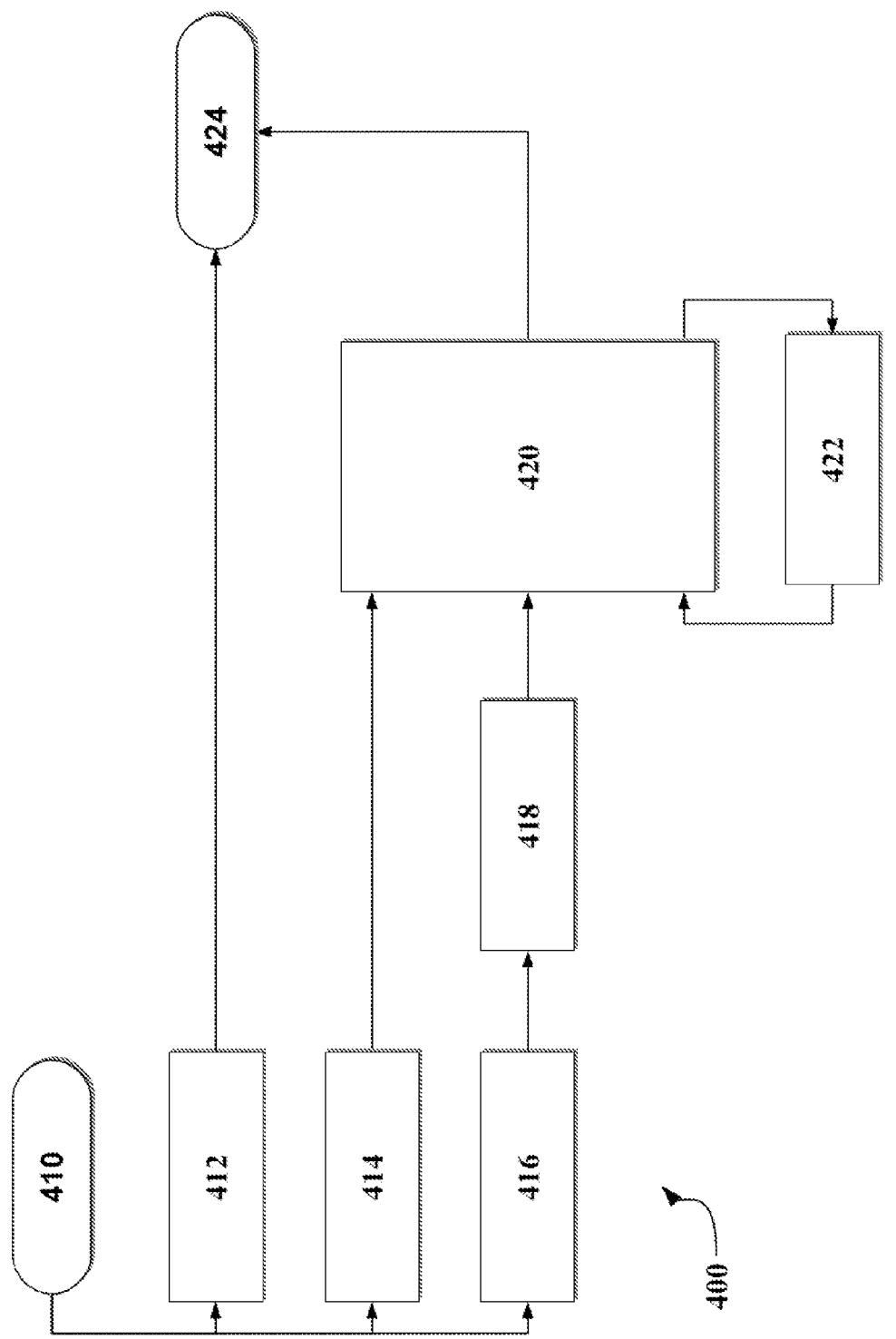
FIG. 4 is a schematic flow chart of a method or algorithm for determining output torque capabilities.

The effective max LT is the output torque capability which the controller 154 determines is best during the specific driving conditions. When, as shown during the first event 202, the capabilities are improving or widening the controller 154 may determine to instead use the inertialess max LT, such that the effective max LT (line 214) does not follow the torque bobble caused by accelerating or decelerating the input node 156. The determination is made using a method 400, which is shown in FIG. 4 and described herein, and which may be stored in executable memory on the controller 154 or other control architecture.

During the first event 202, the additional torque available from the raw max LT (the bobble in which the line 212 rises temporarily above the line 214) is available for use in some other manner. Because the controller 154 has chosen not to send that torque to the output node 158 to propel the vehicle, the controller 154 may command the first electric machine 140 or the second electric machine 142 (or both) to capture that difference in torque between the raw max LT and the effective max LT by generating electrical energy. That electrical energy may then be stored in the battery 122. Alternatively, if the battery 122 is discharging, less energy will need to be discharged.

The power output of the powertrain 110 is equal to the output torque (To) multiplied by the output speed (No), both of which are measured or determined at the output node 158. When the transmission 114 is operated at the effective max LT instead of the higher level of the raw max LT and the output speed is positive (moving forward), there is a negative change in the power output. This negative change in the power output is excess power that may be used elsewhere, such as by the battery 122 or to offset power which would have been required of the battery 122.

Therefore, instead of propelling the vehicle with the additional torque available during the first event 202, that inertial power (which is related to torque via output speed) is converted to electrical energy. Depending upon whether the battery 122 is currently charging or discharging, the excess power may either be stored for later use or used to offset energy being supplied (discharged) by the battery 122 to the powertrain 110 (or possibly to vehicle accessories). The power available for capture by the first electric machine 140 and the second electric machine 142 is related to the difference between the raw max LT and the inertialess max LT (the excess torque) and depends on the output speed (No). Regardless of the magnitude (positive or negative) of the power differential created by varying the output torque capability from the raw max LT, and regardless of the uses of that power differential, the determination of the effective max LT is unchanged.

The driver may also perceive the lack of the torque bobble as a driveability improvement when compared with experiencing the torque bobble. By ignoring the effects of the Ni_dot term (the inertia term) while calculating inertialess max LT, and by setting the effective max LT to the inertialess max LT value during the torque bobble during the first event 202, the controller 154 has improved drivability and captured the excess torque for later use by the vehicle or powertrain 110.

FIG. 2 is described with reference to the input node 156 being the controlled node. Note, however, that in other transient conditions (such as other shifts between operating modes), other nodes of the transmission 114 may be the controlled node. For example and without limitation, some shifts may call for slipping engagement of the second torque-transmitting mechanism 148. In such a situation, the second torque-transmitting mechanism 148 is the controlled node. During engagement of the second torque-transmitting mechanism 148, there may be a similar temporary increase in output torque capability while the second torque-transmitting mechanism 148 is accelerating or decelerating due to slipping engagement, but this additional torque may be removed once the second torque-transmitting mechanism 148 synchronizes and the slip speed goes to zero. The temporary increase in output torque capability may look similar in shape to the torque bobble shown during the first event 202 of FIG. 2, and may be handled similarly by ignoring the inertia effects of accelerating or decelerating the second torque-transmitting mechanism 148 when calculating the inertialess max LT. Note also that the situations described in FIG. 2 may be different if output speed (No) is negative.

The second event 204 and third event 206 illustrate two other situations in which the raw max LT has a temporary change, in these cases a downward bobble. During the second event 204, the input node 156 is being accelerated and the raw max LT follows a reverse path compared to the first event 202. However, because the raw max LT is a narrowing capability (decreasing maximum) during the second event 204, the controller honors the raw max LT and keeps the effective max LT tracking the raw max LT (line 212 is coincident with the line 214) instead of tracking the inertialess max LT (line 216). Because further processing or smoothing of the effective max LT may occur—such as rate-limiting the torque capabilities whenever they are narrowing—the downward bobble may or may not be felt negatively by the driver.

During the third event 206, the raw max LT follows a downward path similar to the second event 204. However, the inertialess max LT also moves downward during the third event 206, as shown on line 216. Because the raw max LT is again narrowing capability during the downward portion of the third event 206, the controller 154 honors the raw max LT and keeps the effective max LT tracking the raw max LT (line 212 is hidden by line 214) instead of the inertialess max LT (line 216). However, as both the raw max LT and the inertialess max LT begin to increase, the capabilities begin narrowing, and the controller 154 brings the effective max LT off of the raw max LT moves the effective max LT to the inertialess max LT. The difference in torque available between the raw max LT and the effective max LT may be used to generate electrical energy with the first electric machine 140 and/or the second electric machine 142.

In order to avoid abrupt changes in output torque, as the effective max LT moves toward the inertialess max LT, the controller 154 rate-limits the change in the torque capability. If the controller 154 did not rate-limit the change to the inertialess max LT, the effective max LT would drop vertically to the inertialess max LT just after the raw max LT begins moving upward. The rate-limiting path shown is not limiting and other methods of rate-limiting, filtering, or shaping the transition to the inertialess max LT may used, including allowing the effective max LT to move downward, such that the line 214 angles downward between the raw max LT (line 212) and the inertialess max LT (line 216).

Figure 3:
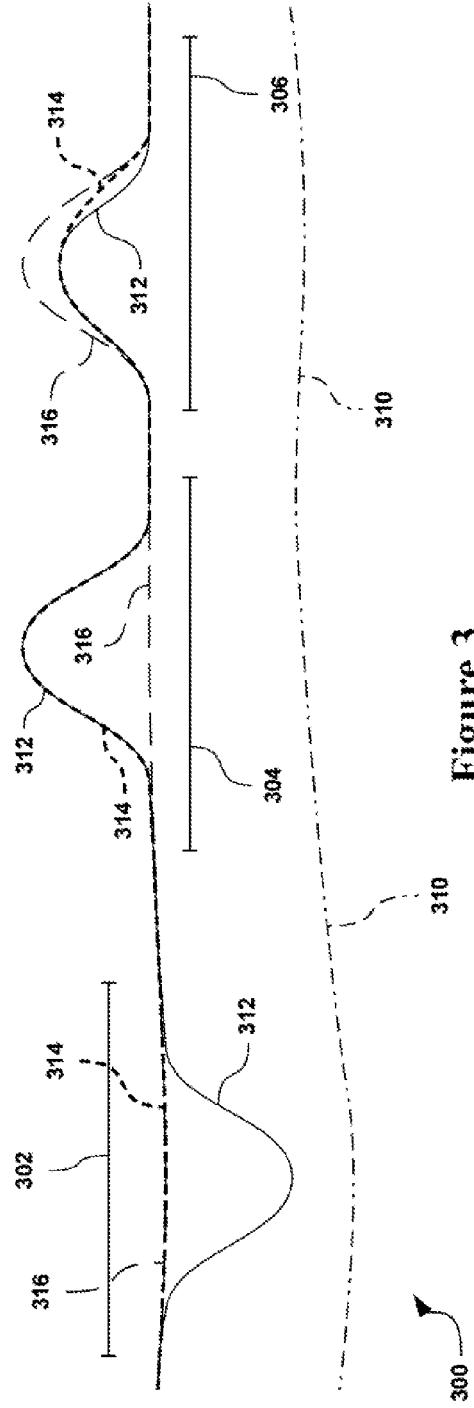
FIG. 3 is an illustrative graph of a driver request lower than minimum long-term output torque.

Referring now to FIG. 3, and with continued reference to FIGS. 1 and 2, there are shown some characteristics of the powertrain 110 during another illustrative driving period 300. The driving period 300 shown may occur, for example, when the driver requests heavy deceleration of the vehicle, causing the vehicle to begin significant regenerative braking in order to negatively accelerate the vehicle. Alternatively, the driving period 300 may occur when the gear selection lever (not shown, often choosing between PRNDL) is in reverse, such that the output speed (No) is negative, and the driver presses the accelerator pedal to a high pedal position, requesting high reverse vehicle acceleration. The driving period 300 is subdivided, again for illustrative purposes only, into a first event 302, a second event 304, and a third event 306. Each of the first through third events 302, 304, and 306 may actually occur as separate events, unrelated to each other.

A driver request 310 shows the level of output torque being requested by the driver. During the driving period 300, the driver request is very low (this will often occur in the negative torque domain), as often signaled by a brake pedal (not shown), a cruise control module, or other vehicle dynamic controls. A line 312 illustrates the raw min LT during the driving period 300 and is shown as a solid line. A line 314 illustrates an effective minimum long-term output torque capability (effective min LT) during the driving period 300 and is shown as a thick dashed line. The effective min LT may be the result of the methods and methods described herein. A line 316 illustrates an inertialess minimum long-term output torque capability (inertialess min LT) during the driving period 300 and is shown as thin, long dashes. The inertialess min LT is the result of a calculation using a different input set in the fundamental torque equation, as described herein. Lines 312 and 316 often overlap and are coincident with line 314, the effective min LT.

As the input node 156 is controlled during the driving period 300, acceleration changes in speed of the input node 156 may again cause fluctuations in the output torque capabilities (raw min LT) of the powertrain 110. For example, accelerating the input node 156 in order to accelerate the first electric machine 140 may cause a decrease in the raw min LT, as shown on the line 312 during the first event 302. However, this downward torque bobble is only a temporary event—probably less than one second—and the raw min LT quickly returns to the prior level as the input node 156 stops accelerating.

As shown in FIG. 3, the driver request 310 cannot be met throughout the illustrative driving period 300. Therefore, the actual torque output of the vehicle will be limited by the output torque capabilities calculated by the controller 154. If the controller 154 simply used the raw min LT to control the powertrain 110, the temporary torque decrease during the first event 302 would allow additional regenerative braking, which would give the vehicle a quick burst of negative output torque followed almost immediately by removing that additional regenerative torque. To the driver, the first event 302 may feel like a sudden increase in braking followed by a sudden removal of that added braking. Therefore, the controller 154 also calculates the inertialess min LT.

During the first event 302, the inertialess min LT remains substantially flat (the line 316 and the line 314 are coincident) and does not follow the increasing (and then decreasing) raw min LT shown on the line 312. After calculating both the raw min LT (line 312) and the inertialess min LT (line 316), the controller 154 may then arbitrate to decide which of the two output torque capabilities will be used as the effective min LT.

The effective min LT is the output torque capability which the controller 154 determines is best during the specific driving conditions. When, as shown during the first event 302, the capabilities are improving or widening (allowing lower minimums) the controller 154 may determine to instead use the inertialess min LT, such that the effective min LT (line 314) does not follow the downward torque bobble caused by decelerating the input node 156. The determination is again made using the method 400 shown in FIG. 4.

During the first event 302, the additional regenerative torque available from the raw min LT (the bobble in which the line 312 drops temporarily below the line 314) is available for use in some other manner. Because the controller 154 has chosen not to capture that torque with the first electric machine 140 or the second electric machine 142 (or both) the controller 154 may send that torque to the output node 158 to propel the vehicle by reducing the available regenerative braking.

Unlike the first event 202 shown in FIG. 2, during the first event 302 the controller 154 allows the vehicle itself to maintain extra energy (the vehicle continues deceleration) instead of storing more electrical energy in the battery 122 or discharging less energy from the battery 122. The difference between the effective min LT and the raw min LT multiplied by the output speed (No) equals the change in power. When this change in output power is negative (either from negative torque change or negative output speed), the power flow from battery 122 into the transmission 114 is decreased. Additionally, the driver may perceive the lack of the torque bobble (additional regenerative braking) as a driveability improvement when compared with experiencing the torque bobble. By ignoring the effects of the Ni_dot term (the inertia term) while calculating inertialess min LT, and by setting the effective min LT to the inertialess min LT value during the torque bobble of the first event 302, the controller 154 has improved drivability and maintained vehicle kinetic energy which may later be converted to electric energy.

The second event 304 and third event 306 illustrate analogous situations to the second and third events 204 and 206 shown in FIG. 2, and illustrate two other situations in which the raw min LT has a temporary change. During the second event 304, the input node 156 is usually being decelerated and the raw min LT follows a reverse path compared to the first event 302. During the second event 304, because the raw min LT is a narrowing capability (increasing minimum limit), the controller honors the raw min LT and keeps the effective min LT tracking the raw min LT (line 312 is coincident with the line 314) instead of tracking the inertialess min LT (line 316). Further processing or smoothing of the effective min LT may occur to minimizes driveability effects of the additional torque bobble.

During the third event 306, the raw min LT follows an upward path similar to the second event 304. However, the inertialess min LT also moves upward during the third event 306, as shown on line 316. Because the raw min LT is again narrowing capability during the initial portion of the third event 306, the controller 154 honors the raw min LT keeps the effective min LT tracking the raw min LT (line 312 and line 314 are coincident) instead of the inertialess min LT (line 316). However, as both the raw min LT and the inertialess min LT begin to decrease, the capabilities begin narrowing, and the controller 154 brings the effective min LT off of the raw min LT and moves the effective min LT toward the inertialess min LT. Rate-limiting is used to smooth the transition of the effective min LT from the raw min LT to the inertialess min LT.

Referring now to FIG. 4, and with continued reference to FIGS. 1-3, there is shown a method 400 usable for determining output torque capabilities in a transmission (such as the transmission 114 of the powertrain 114). The method 400 is shown as a schematic flow chart.

For illustrative purposes, the method 400 may be described with reference to the elements and components shown and described in relation to FIG. 1, and with reference to the situations and events illustrated in FIGS. 2 and 3. However, other components may be used to practice the method 400 and the invention defined in the appended claims. The method 400 may stored in and executed by the controller 154 or other control architecture, including multiple independently-operating control modules or controllers.

The exact order of the steps of the algorithm or method 400 shown in FIG. 4 is not required. Steps may be reordered, steps may be omitted, and additional steps may be included.

Step 410: Start.

The method 400 begins at a start or initiation step 410, during which time the method 400 is monitoring operating conditions of the vehicle. Initiation may occur in response to the vehicle operator inserting the ignition key or in response to the vehicle being unlocked, or the method 400 may be running constantly or looping whenever the vehicle is in use. Alternatively, the method 400 may be initiated whenever the controller 154 begins controlling the speed of the first node (the input node 156). When the transmission 114 is operating with only two speed degrees of freedom, the controller 154 is only controlling the input node 156 and cannot control both the input node 156 and the output node 158 simultaneously.

The method 400 may be a sub-routine of the larger control architecture and only executed when specific conditions arise. For example, and without limitation, the method 400 may be initiated during specific shift events. The method 400 may be stored on, and executed by, the controller 154, or different parts of the method 400 may be distributed throughout different controllers.

Step 412: Calculate Short-Term Capabilities.

The method 400 includes calculating short-term output torque capabilities. This may include calculating both maximum and minimum output torque capabilities, such as the raw max ST and the raw min ST. Alternatively, the method 400 may be executed separately for maximum and minimum output torque capabilities.

Step 414: Calculate Raw Long-Term Capabilities.

The method 400 includes calculating the raw max LT and the raw min LT as a function of at least the acceleration and the speed of the first node and the second node, which may be the input node 156 and the output node 158, respectively. The method 400 is calculating the raw max LT and the raw min LT by inputting the raw input set into the fundamental torque equation. The raw input set also includes terms due to torque from the first electric machine 140, the second electric machine 142, and the engine 112, in addition to other relevant inputs affecting maximum or minimum output torque capabilities.

Step 416: Remove Effects of the Controlled Node.

The method 400 includes determining which of the nodes is the controlled node and removing the effects of that node on the calculation of the long-term output torque capabilities. This may be accomplished by removing the acceleration term for the controlled node and its associated constant from the fundamental torque equation. Alternatively, the constant term for the controlled node may be set to zero. For the illustrative fundamental torque equation shown herein, k15 may be set to zero, which causes the calculation to ignore the effects of Ni_dot.

Step 418: Calculate Inertialess Long-Term Capabilities.

The method 400 includes calculating the inertialess max LT from the inertialess input set. The inertialess max LT is identical to the raw max LT except that the inertialess max LT ignores torque capability due to the acceleration of the first node 156.

Step 420: Arbitrate to Determine Effective Long-Term Capabilities.

The controller 154 then determines the effective max LT and the effective min LT by arbitrating the different torque capabilities already calculated. At step 420 the method 400 includes calculating a new effective maximum long-term output torque capability (new effective max LT) as a function of the raw max LT and the inertialess max LT. The method 400 also includes calculating a new effective minimum long-term output torque capability (new effective min LT). The new effective max LT and the new effective min LT are the end result of the arbitration in step 420.

Calculating the new effective max LT includes reading a previous effective maximum long-term output torque capability (previous effective max LT), which was calculated in a previous iteration of the method with the same function used in calculating the new effective max LT. The previous effective max LT is fed back into the controller 154 and arbitrated with the raw max LT and the inertialess max LT.

The arbitration may be very basic. For example: if the raw max LT is greater than the inertialess max LT, the new effective max LT is set to the inertialess max LT, and if the raw max LT is not greater than the inertialess max LT, operating the transmission 114 at the raw max LT.

However, the arbitration may also determine the new effective max LT with reference to the previous effective max LT. If the raw max LT is less than the previous effective max LT, then the new effective max LT is set equal to the raw max LT. This situation is shown in the second event 204 of FIG. 2. However, if the raw max LT is not less than the previous effective max LT, then the new effective max LT is set equal to the inertialess max LT. This situation is shown in the first event 202 of FIG. 2.

When setting the new effective max LT equal to the inertialess max LT, step 422 may include rate-limiting the inertialess max LT. When rate limiting is used, the transition from the raw max LT to the inertialess max LT is prevented from causing abrupt changes in output torque, as shown in the third event 206 of FIG. 2.

The method 400 will also calculate the new effective min LT, which includes reading a previous effective minimum long-term output torque capability (previous effective min LT). Arbitration for the new effective min LT is similar to the arbitration for the new effective max LT. If the raw min LT is greater than the previous effective min LT, then the new effective min LT is set equal to the raw min LT, as shown in the second event 304 and the first portion of the third event 306 of FIG. 3. However, if the raw min LT is not greater than the previous effective min LT, then the new effective min LT is set equal to the inertialess min LT, as shown in the first event 302 of FIG. 3.

Step 422: Log Effective Long-Term Capabilities.

After determining the new effective max LT and the new effective min LT, the method 400 logs these values in step 422. The new effective max LT and the new effective min LT are looped back to the arbitration step 420 and become the previous effective max LT and the previous effective min LT for the next iteration of the method 400.

Step 424: End; Additional Processing.

The new effective max LT and the new effective min LT are moved to further methods for additional processing, such as arbitration with additional torque considerations. When the new effective max LT is less than the raw max LT, the method 400 includes capturing the difference between the raw max LT and the new effective max LT which alters the power of the battery 122 depending upon the output speed (No).

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method for determining output torque capabilities in a transmission having a first node, a second node, and a third node, each of which has a speed and an acceleration, the method comprising:
   controlling the speed of the first node;
   calculating a real maximum long-term output torque capability (raw max LT) as a function of at least the acceleration and the speed of the first node and the second node;
   calculating an inertialess maximum long-term output torque capability (inertialess max LT), wherein the inertialess max LT is identical to the raw max LT except that the inertialess max LT ignores torque capability due to the acceleration of the first node; and
   comparing the raw max LT to the inertialess max LT, and:
      if the raw max LT is greater than the inertialess max LT, setting the output torque capabilities of the transmission equal to the inertialess max LT, and
      if the raw max LT is not greater than the inertialess max LT, setting the output torque capabilities of the transmission equal to the raw max LT.

2. The method of claim 1,
   wherein the transmission includes an electric machine;
   wherein the first node is an input node for the transmission and the second node is an output node for the transmission;
   wherein the transmission includes a first speed degree of freedom and a second speed degree of freedom, and only one of the first speed degree of freedom and the second speed degree of freedom may be controlled concurrently; and
   wherein setting the output torque capabilities of the transmission equal to one of the raw max LT and the inertialess max LT includes controlling the input node as the first speed degree of freedom, and does not include controlling the output node as the second speed degree of freedom.

3. The method of claim 2, further comprising calculating a new effective maximum long-term output torque capability (new effective max LT) as a function of the raw max LT and the inertialess max LT, wherein calculating the new effective max LT includes:
   reading a previous effective maximum long-term output torque capability (previous effective max LT), wherein the previous max LT was calculated in a previous iteration of the method with the same function used in calculating the new effective max LT;
   if the raw max LT is less than the previous effective max LT, then setting the new effective max LT equal to the raw max LT; and
   if the raw max LT is not less than the previous effective max LT, then setting the new effective max LT equal to the inertialess max LT.

4. The method of claim 3, wherein setting the new effective max LT equal to the inertialess max LT includes rate-limiting the inertialess max LT.

5. The method of claim 4, further comprising:
   calculating a real minimum long-term output torque capability (raw min LT) a function of at least the acceleration and the speed of the first node and the second node;
   calculating an inertialess minimum long-term output torque capability (inertialess min LT), wherein the inertialess min LT is identical to the raw min LT except that the inertialess min LT ignores torque capability due to the acceleration of the first node; and
   calculating a new effective minimum long-term output torque capability (new effective min LT) as a function of the raw min LT and the inertialess min LT, including:
      reading a previous effective minimum long-term output torque capability (previous effective min LT), wherein the previous min LT was calculated in a previous iteration of the method with the same function used in calculating the new effective min LT,
      if the raw min LT is greater than the previous effective min LT, then setting the new effective min LT equal to the raw min LT, and
      if the raw min LT is not greater than the previous effective min LT, then setting the new effective min LT equal to the inertialess min LT.

6. The method of claim 5, further comprising capturing the difference between the raw max LT and the new effective max LT by generating electrical energy with the electric machine while operating the transmission at the new effective max LT.

7. A method for determining output torque capabilities in a transmission having a first node, a second node, and a third node, each of which has a speed and an acceleration, the method comprising:
   controlling the speed of the first node;
   calculating a real maximum long-term output torque capability (raw max LT) as a function of at least the acceleration and the speed of the first node and the second node;

calculating an inertialess maximum long-term output torque capability (inertialess max LT), wherein the inertialess max LT is identical to the raw max LT except that the inertialess max LT ignores torque capability due to the acceleration of the first node; and calculating a new effective maximum long-term output torque capability (new effective max LT) as a function of the raw max LT and the inertialess max LT, wherein calculating the new effective max LT includes:

reading a previous effective maximum long-term output torque capability (previous effective max LT), wherein the previous max LT was calculated in a previous iteration of the method with the same function used in calculating the new effective max LT, if the raw max LT is less than the previous effective max LT, then setting the new effective max LT equal to the raw max LT, and if the raw max LT is not less than the previous effective max LT, then setting the new effective max LT equal to the inertialess max LT.

8. The method of claim 7, wherein setting the new effective max LT equal to the inertialess max LT includes rate-limiting the transition from the previous effective max LT to the inertialess max LT.

9. The method of claim 8, wherein the transmission includes an electric machine;

wherein the first node is an input node for the transmission and the second node is an output node for the transmission;

wherein the transmission includes a first speed degree of freedom and a second speed degree of freedom, and only one of the first speed degree of freedom and the second speed degree of freedom may be controlled concurrently; and wherein calculating the new effective max LT includes controlling the input node as the first speed degree of freedom, and does not include controlling the output node as the second speed degree of freedom.

10. A system operative for determining output torque capabilities in a transmission comprising:

a first node, a second node, and a third node, each of which has a speed and an acceleration;

a controller configured to control the speed of the first node by:

calculating a real maximum long-term output torque capability (raw max LT) as a function of at least the acceleration and the speed of the first node and the second node, calculating an inertialess maximum long-term output torque capability (inertialess max LT), wherein the inertialess max LT is identical to the raw max LT except that the inertialess max LT ignores torque capability due to the acceleration of the first node, and calculating a new effective maximum long-term output torque capability (new effective max LT) as a function of the raw max LT and the inertialess max LT; and wherein the controller is further configured to calculate the new effective max LT by:

reading a previous effective maximum long-term output torque capability (previous effective max LT), wherein the previous max LT was calculated by the controller with the same function used in calculating the new effective max LT, if the raw max LT is less than the previous effective max LT, the controller sets the new effective max LT equal to the raw max LT, and if the raw max LT is not less than the previous effective max LT, the controller sets the new effective max LT equal to the inertialess max LT, wherein transitions from the previous effective max LT to the inertialess max LT are rate-limited.

11. The system of claim 10, further comprising:

an electric machine;

wherein the first node is an input node for the transmission, the second node is an output node for the transmission, and the third node is the electric machine;

wherein the transmission is configured with a first speed degree of freedom and a second speed degree of freedom, such that only one of the first speed degree of freedom and the second speed degree of freedom may be controlled concurrently; and wherein the controller is configured to control the input node as the first speed degree of freedom when calculating the new effective max LT, and is configured not to control the output node as the second speed degree of freedom.

* * * * *